United States Patent [19]

Yatka et al.

[11] Patent Number: 5,431,929
[45] Date of Patent: Jul. 11, 1995

[54] CHEWING GUM PRODUCTS USING OLIGOFRUCTOSE

[75] Inventors: Robert J. Yatka, Orland Park; Lindell C. Richey, Lake Zurich; Marc A. Meyers, Naperville, all of Ill.

[73] Assignee: Wm. Wrigley Jr. Company, Chicago, Ill.

[21] Appl. No.: 244,845

[22] Filed: Jul. 28, 1994

Related U.S. Application Data

[63] Continuation-in-part of application Ser. No. PCT/US91/09632, filed Dec. 20, 1991.

[51] Int. Cl.⁶ .............................................. A23G 3/30
[52] U.S. Cl. ................................... 426/3; 426/5; 426/658
[58] Field of Search ................................ 426/36, 658

[56] References Cited

U.S. PATENT DOCUMENTS

| | | | |
|---|---|---|---|
| 2,782,123 | 2/1957 | Rubin | 426/658 |
| 3,894,146 | 7/1975 | Tsuyama | 426/3 |
| 4,613,377 | 9/1986 | Yamazaki et al. | 127/39 |
| 4,681,771 | 7/1987 | Adachi et al. | 426/658 |
| 4,722,844 | 2/1988 | Ozawa et al. | 426/3 |
| 4,724,136 | 2/1988 | Scheibl | 424/50 |
| 4,728,515 | 3/1988 | Patel et al. | 426/3 |
| 4,871,574 | 10/1989 | Yamazaki et al. | 426/804 |
| 4,902,525 | 2/1990 | Kondou | 426/548 |
| 4,902,674 | 2/1990 | Speights | 514/23 |
| 4,937,092 | 6/1990 | Brotsky et al. | 426/643 |
| 4,957,763 | 9/1990 | Saita et al. | 426/548 |
| 4,978,751 | 12/1990 | Biton et al. | 536/123 |
| 4,987,124 | 1/1991 | Speights et al. | 426/548 |
| 5,013,576 | 5/1991 | Nakazawa et al. | 426/640 |
| 5,032,579 | 7/1991 | Speights et al. | 514/23 |
| 5,095,106 | 3/1992 | Gaffar et al. | 536/123 |
| 5,127,956 | 7/1992 | Hansen et al. | 127/42 |
| 5,169,671 | 12/1992 | Harada et al. | 426/658 |

FOREIGN PATENT DOCUMENTS

| | | |
|---|---|---|
| 0301628A1 | 2/1989 | European Pat. Off. |
| 0337889A1 | 10/1989 | European Pat. Off. |
| 0397027A1 | 11/1990 | European Pat. Off. |
| 0498463A1 | 8/1992 | European Pat. Off. |
| 0532775A1 | 3/1993 | European Pat. Off. |
| 59-173066 | 9/1984 | Japan |
| 1-037255 | 2/1989 | Japan |
| 4-135460 | 5/1992 | Japan |
| 4-356169 | 12/1992 | Japan |
| WO91/13076 | 9/1991 | WIPO |
| WO92/08368 | 5/1992 | WIPO |
| WO92/08371 | 5/1992 | WIPO |
| WO93/02566 | 2/1993 | WIPO |
| WO93/06740 | 4/1993 | WIPO |
| WO93/12666 | 7/1993 | WIPO |

OTHER PUBLICATIONS

"Polyfructan and Oligofructans Synthesized from Sucrose by Conidia of *Aspergillus sydowi* IAM 2544," by Genshiro Kawai, Hajime Taniguchi and Michinori Nakamura, from *Agr. Biol. Chem*, 37(9), pp. 2111–2119 (1973).
NutraFlora TM Fructooligosaccharide Information by ZeaGen, Inc., information package, 21 pages (Mar., 1992).
"Introduction to OLIGO-SUGAR," Cheil Foods & Chemicals Inc., Seoul, Korea, 8 pages, undated.
Fructooligosaccharide Information Package, Coors BioTech, Inc., 18 pages (May, 1990).
"Soluble & Insoluble Bulking Agents Prospects & Applications" schedule of events, organized by International Business Communications, 3 pages (Mar., 1991).
"Inulin and Inulo-oligosaccharides: Their Properties and Use as Soluble Bulking Agents" by Dr. George Smits and Dr. Barrie Norman, 10 pages (Mar., 1991).
Raftilose, Oligofructose, Raffinerie Tirlemontoise S.A., Tiense Suikerraffinaderij N. V., 27 pages, undated.
Raftiline, Raftiline, Raffinerie Tirlemontoise S.A., Tiense Suikerraffinaderij N.V., 21 pages, undated.
"Fructooligosaccharides (FOS)—An all Natural, Versatile, Low-Calorie Bulking Agent," by Dr. Peter J. Perna, 36 pages, undated.

*Primary Examiner*—Jeanette Hunter
*Attorney, Agent, or Firm*—Steven P. Shurtz; Willian Brinks Hofer Gilson & Lione

[57] ABSTRACT

Chewing gum products containing oligofructose and methods of making such products are disclosed. In one embodiment, the oligofructose is used in a rolling compound applied to the chewing gum product. In a second embodiment, the oligofructose is used in a coating, such as a hard-shell coating, for a pellet gum. In a third embodiment, oligofructose is used in the center fill of a chewing gum. In a fourth embodiment, aspartame is used to sweeten the gum composition and oligofructose is provided, preferably in an effective amount to stabilize the aspartame such that after eight weeks of storage at 85° F., at least 5% less aspartame decomposes than would have decomposed if the oligofructose were not included. Oligofructose is also codried with other sweeteners, coevaporated to make syrups and used as an encapsulating agent for high-intensity sweeteners or flavors used in gum compositions.

28 Claims, 8 Drawing Sheets

CHEWING GUM PRODUCTS USING OLIGOFRUCTOSE

CROSS REFERENCE TO RELATED APPLICATION

The present application is a continuation-in-part of application Ser. No. PCT/US91/09632 filed as a PCT application on Dec. 20, 1991. That application, published as PCT Publication No. WO92/08371, is incorporated herein by reference.

BACKGROUND OF THE INVENTION

The present invention relates to improved compositions of chewing gum. More particularly, the invention relates to improving chewing gum by the use of specific bulking agents in sugar and non-sugar chewing gum products to give improved texture, moisture absorption properties, and improved shelf life properties. The improved chewing gum compositions may also be used in a variety of chewing gum products such as confectionery coated chewing gum products.

In recent years, efforts have been devoted to replace sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture and shelf life properties of chewing gum for consumers.

The non-sugar polyols have the advantage of not contributing to dental caries of consumers, as well as being able to be consumed by diabetics. However, all polyols have the disadvantage of causing gastrointestinal disturbances if consumed in too great of a quantity. Therefore it would be a great advantage to be able to use a carbohydrate or carbohydrate-like food ingredient for chewing gum that would act as a bulking agent, but not contribute to dental caries nor cause as severe gastrointestinal disturbances.

One such bulking agent is called oligofructose, or inulin-oligosaccharides. Oligofructoses are oligosugars whose fructose units are bonded to each other, often with a glucose molecule attached at the end. Inulin or oligofructoses belong to the group of fructoses which are naturally occurring in 30,000 different plant species and which is, after starch, the most abundant non-structure (non-cellulosic) carbohydrate.

Inulin is the long chain oligofructose found in the plant species. After extraction, inulin may be hydrolyzed enzymatically to lower molecular weight carbohydrates, which are inulin oligosaccharides. Both the inulin and inulin-oligosaccharides are oligofructoses.

Oligofructose is similar to a larger group of materials known as fructooligosaccharides (FOS). The difference between FOS and oligofructose as used herein is that commercial FOS is made by enzymatically adding fructose molecules to a sucrose molecule to obtain FOS, whereas oligofructose is based on inulin from plants and includes inulin and inulin broken down or hydrolyzed to smaller oligofructoses. PCT application Ser. No. PCT/US91/07172 filed Sep. 30, 1991, published as PCT Publication No. WO92/08368, discloses the use of fructooligosaccharides (FOS) in chewing gum.

Oligofructose bulking agent is not approved for use in human food products or in chewing gum in the United States, but has a pending GRAS status. In Belgium, Luxembourg, France, the Netherlands, Denmark and Japan, oligofructose is already considered a food stuff. Although a sugar, oligofructose may not contribute significantly to dental caries, contributes to dietary fiber, and does not significantly contribute to calories. Thus, this ingredient's use in chewing gum could be a definite improvement.

U.S. Pat. No. 3,894,146 discloses a coupling sugar called oligoglucosyl fructose derived from other sugars.

Fructosyl oligomers and oligosaccharides are disclosed in U.S. Pat. No. 4,978,751, EPO Patent Publication No. 0 301 628 and EPO Patent Publication No. 0 337 889.

Fructooligosaccharides (FOS) are disclosed in U.S. Pat. Nos. 4,902,674; 4,987,124; and 5,032,579 as a method and composition for inhibiting the growth of Salmonella. Fructooligosaccharides are also disclosed in EPO Patent Publication No. 0 397 027 as a method for killing pests.

Oligofructose type of fructose compounds were first disclosed in U.S. Pat. No. 2,782,123. The bulk sweetener is obtained from Jerusalem artichoke tubers which contain significant amounts (5–20%) of inulin. Also disclosed is the inulin treated by acid hydrolysis.

PCT Publication No. WO91/13076 discloses branched fructo-oligosaccharides consisting of a chain of mainly fructose units with one or more side chains mainly composed of fructose units. The use of the branched fructo-oligosaccharides in chewing gum is disclosed.

EPO Publication No. 0 498 463 discloses a release-sustained composition for application to the oral cavity that includes oligofructose. The composition may also contain a high-intensity sweetener such as aspartame. It is further suggested that the composition may be used in chewing gum.

U.S. Pat. No. 4,681,771 discloses a low caloric, low cariogenic sweetener comprising oligosaccharides having from 1 to 4 molecules of fructose bound to sucrose. The use of the sweetener in chewing gum is described. The patent is assigned to the Japanese firm of Meiji Seika Kaisha, who have joined forces with Coors Biotech, Inc. to manufacture and market a FOS product under the trade name NutraFlora.

Another company, Raffinerie Tirlemontoise SA, has developed an oligofructose from chicory root, which also contains about 5–20% inulin. The naturally occurring inulin is extracted from the root, purified, and dried. This product has the trade name Raftiline. A lower molecular weight material, called Raftilose, is made by enzymatic hydrolysis of Raftiline. These materials were described at a seminar given by IBC USA Conferences Inc. (International Business Communications) in Atlanta, Ga. on Mar. 13–14, 1991. Information on Raftilose and Raftiline from the seminar is presented in a manual available from IBC USA Conferences, Inc., 8 Pleasant St. Bldg. D, South Natick, Mass.

SUMMARY OF THE INVENTION

Chewing gum products using oligofructose and methods of making such gum products have been invented. In one embodiment, oligofructose is used in a rolling compound applied to the chewing gum product. In a second embodiment, oligofructose is used in a coating, such as a hard-shell coating, for a pellet gum. In a third embodiment, oligofructose is used in a centerfill of a chewing gum product. In a fourth embodiment, aspartame is used to sweeten the gum composition. Preferably the oligofructose is provided in an effective amount to stabilize the aspartame such that after eight weeks of storage at 85° F., at least 5% less aspartame decomposes than would have decomposed if the oligofructose was not included. Oligofructose is also used as an encapsulating agent for high-intensity sweeteners or flavors used in gum compositions. In yet another embodiment, oligofructose is co-dried from a solution with another sweetener selected from the group consisting of sugar sweeteners, alditol sweeteners and high-intensity sweeteners and used in a gum composition. In still another embodiment, oligofructose and a plasticizing agent are coevaporated to form a syrup that is used in a gum composition.

Even though oligofructose is very similar to sucrose, it is not cariogenic. Also, since it does not cause as great of gastrointestinal disturbances as polyolys, it gives a highly consumer-acceptable chewing gum product.

DETAILED DESCRIPTION OF THE DRAWINGS AND PREFERRED EMBODIMENTS OF THE INVENTION

Figure 1:
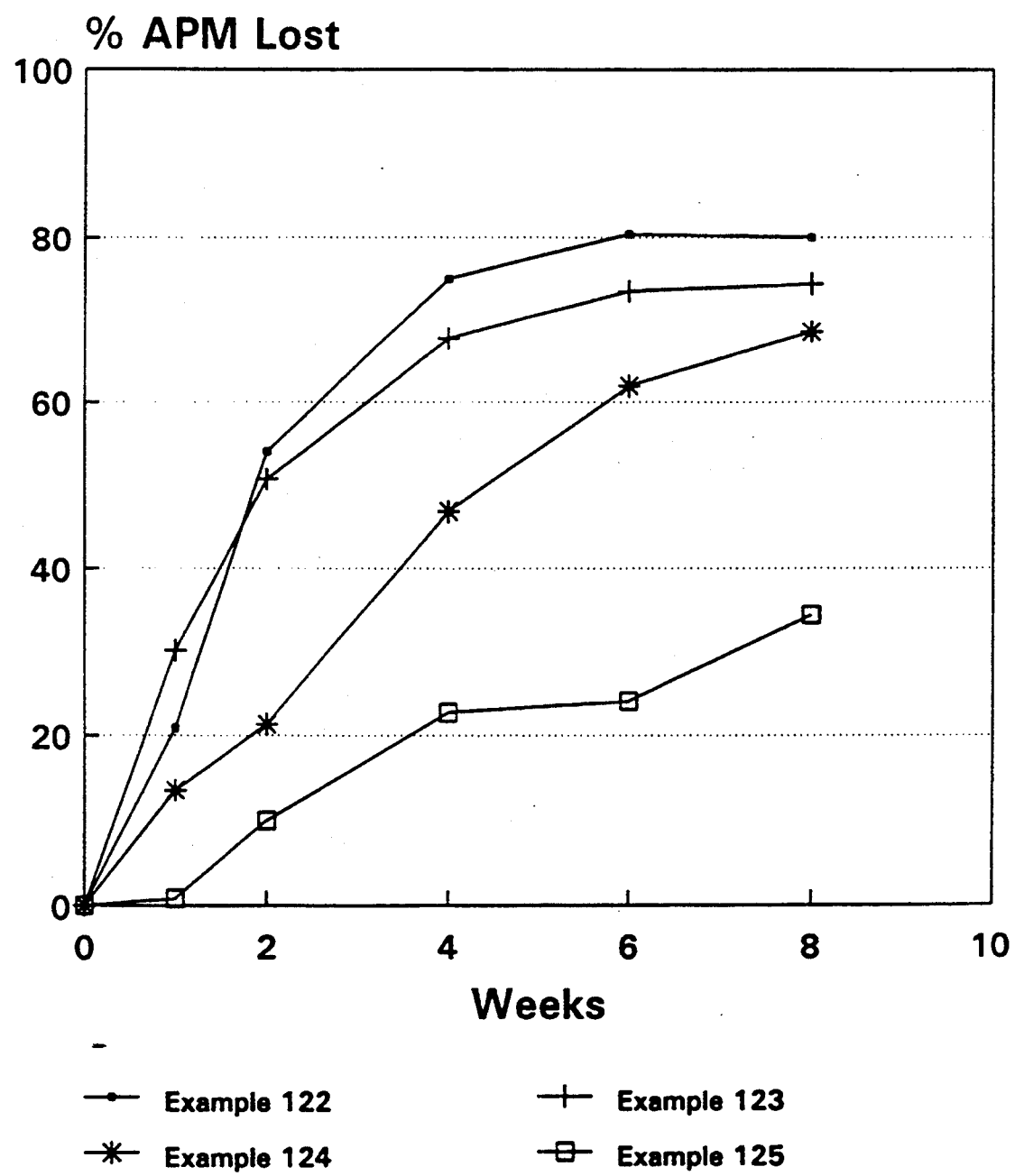
FIG. 1 shows test results of aspartame stability for gum made with oligofructose.

As used herein, the term chewing gum also includes bubble gum and the like. Unless otherwise specified, all percentages used herein are weight percents.

Oligofructose is a mixture of specific fructooligosaccharides composed of two or more fructose molecules linked by a $\beta$-1, 2 bond. A glucose molecule often occurs at the end of the chain. The "degree of polymerization" or DP gives the total number of molecules that are linked. As disclosed herein, oligofructose is defined as inulin and inulin-oligosaccharides.

Two oligofructoses or inulin-oligosaccharide materials are commercially available as products called Raftiline and Raftilose from Raffinerie Tirlemontoise SA (Tienon Sugar). The Tienon Sugar/Sudzucker Group is the largest European sugar producer. Raftiline oligofructose is the natural carbohydrate inulin. Raftilose is an inulin hydrolyzate, also called an inulin oligosaccharide, made by enzymatic hydrolysis of inulin.

Raftiline, available in powder form, is obtained from chicory roots and is a mixture of $GF_n$ molecules where:
G=glucose
F=fructose
n=number of fructose units linked and ranging from about two to more than 50.

Raftilose, being the hydrolysis product from Raftiline, is composed of shorter length molecules of $GF_n$ (glucofructosans) and $F_m$ (fructosans) where "n" and "m" are about 2 to 9.

NutraFlora ™, available from ZeaGen (formerly Coors Biotech, Inc.), is a fructooligosaccharide (FOS) that contains mostly $GF_2$ (1-ketose) and $GF_3$ (nystose), with some $GF_4$ (1,$\beta$-fructofuranosyl nystose). However, since NutraFlora ™ is enzymatically prepared by recombining sucrose with fructose, is believed to have a different carbohydrate distribution than inulin oligasaccharides, and is therefore not an oligofructose for purposes of the present invention.

Raftilose is available from the supplier in both syrup and powder forms. Four versions of Raftilose are available, Raftilose 30, 60, 85 and 95. The names indicate different levels of hydrolysis. For example, Raftilose 95 contains 95% oligofructose units and 5% sugars (glucose, fructose and sucrose). A complete hydrolysis product, wherein the inulin is hydrolized to 15% glucose and 85% fructose, is also available called Raftisweet.

Raftilose 95, used in most of the examples herein, is most commonly available in its powder form, but is also available as a syrup. Raftilose 30, 60 and 85 are most commonly available as syrups. Raftiline, the inulin material, is only available in a powdered form. All of these forms, except Raftisweet, are referred to herein as oligofructose.

Oligofructose may be added to chewing gum in its solid or syrup form. Its solubility in water is about 80% for Raftilose, depending on the degree of hydrolysis of the inulin, but only about 12% for Raftiline at room temperature. The solubility of both Raftilose and Raftiline increases with increased temperature.

Oligofructose may be used in chewing gum as a texture and flavor modifier, bulking agent, and may improve texture, flavor, and shelf life properties. Oligofructose may replace solids like sucrose, dextrose or lactose when used in its powder form, or may replace syrups when used in its liquid or syrup form. At levels of about 0.5% to about 25%, oligofructose may replace part of the solids in sugar gum or, as a liquid, all or part of the syrup in sugar gum. At higher levels of about 25% to about 90% of the gum formulation, oligofructose may replace all of the solids in a chewing gum formulation.

In its powder or liquid form, a sufficient quantity of oligofructose can stabilize aspartame. At levels above 10%, oligofructose may replace significant quantities of sucrose and syrup. Because of the resulting lower sweetness, aspartame may be added. It has been found that aspartame is stabilized with oligofructose, especially when the oligofructose is used at a level of 10% or more of the gum. In preferred embodiments, an effective amount of oligofructose is used in gums with sweetness imparting amounts of aspartame to stabilize the aspartame against decomposition during storage at 85° F. for eight weeks whereby at least 5% less aspartame decomposes into non-sweetening derivatives than would have decomposed if the oligofructose were not included in the gum composition. Because aspartame has such high potency and is used at such low levels, and because of its high cost, even a 5% reduction in degradation is a significant benefit. While the aspartame contemplated will generally be unencapsulated, the term "unencapsulated" as used herein applies to aspartame which, even if treated or partially encapsulated, is still subject to some degradation in the gum formulation.

Although oligofructose, specifically Raftilose, has some properties like sucrose, its anti-caries properties suggest it may be used in chewing gum formulations containing non-sugar ingredients. Non-sugar ingredients are alditols such as sorbitol, mannitol, xylitol, lactitol, palatinit (hydrogenated isomaltulose), maltitol, and hydrogenated starch hydrolyzates. These alditols are used in a variety of combinations to develop unique sugarless chewing gum formulations. Oligofructose may be used to replace the individual alditols or combinations of alditols. With partial replacement of one or more alditols, oligofructose can be used at levels of about 0.5–25%. If oligofructose replaces a large amount or most of the alditols, this level may be about 25% to about 90% of the gum formulation.

Raftilose oligofructose has properties similar to syrups, sugars, hydrogenated starch hydrolyzates, sorbitol and most other polyols in that it is highly water soluble with a low viscosity in water. Raftiline, on the other hand, is a long chain polymer and is less soluble in water and gives a high viscosity. For this reason, Raftiline oligofructose should be used in formulas disclosed herein at about half the level or less than Raftilose would normally be used.

Some sugar-free chewing gum formulations contain high levels of glycerin and are very low in moisture, i.e., less than about 2%. Oligofructose as a powder or liquid may replace part or all of the glycerin used in these types of formulations. At higher moisture levels (more than 2%) in sugar-free gum, a sorbitol liquid (70% sorbitol, 30% water) is used. When using oligofructose, preferably sorbitol liquid may also be used to obtain soft textured gum formulations. Previous high moisture formulations containing sorbitol liquid were not made with aspartame, since the moisture caused degradation of aspartame. However, when sufficient oligofructose (generally greater than about 10%) is added to a high moisture gum, aspartame is stabilized, and degradation is reduced or eliminated.

Recent advances use hydrogenated starch hydrolyzates (HSH) and glycerin preblended and co-evaporated to reduce moisture in some sugar-free gum formulations. Oligofructose may be used to replace part or all of the HSH/glycerin blends in such chewing gum formulations. Aqueous oligofructose solids and/or oligofructose syrup may also replace HSH in the preblend with glycerin and be coevaporated with glycerin to obtain a low moisture, non-crystallizable blend. Combinations of oligofructose solids/syrup with alditols like sorbitol, maltitol, xylitol, lactitol and mannitol in aqueous form may also be blended with glycerin and coevaporated for use in low-moisture, sugar-free gum.

Oligofructose may be used in gum formulations with hydrogenated starch hydrolyzates (HSH) without preblending with glycerin and coevaporation. Low levels of moisture are not necessary to prevent degradation of aspartame when oligofructose is used, so HSH syrups at about 20–30% moisture do not need to be modified to reduce moisture to improve aspartame stability.

In a similar manner, oligofructose solids/syrup preblended in glycerin and co-evaporated may be used in conventional sugar chewing gum formulations. Oligofructose may be combined with other sugars like dextrose, sucrose, lactose, maltose, invert sugar, fructose and corn syrup solids to form a liquid mix to be blended with glycerin and co-evaporated. Oligofructose solids/syrup may also be mixed with conventional syrup and blended with glycerin and co-evaporated for use in a sugar chewing gum formulation.

Oligofructose bulk sweetener may be co-dried with a variety of sugars such as sucrose, dextrose, lactose, fructose and corn syrup solids and used in a sugar-containing gum formulation. Oligofructose may also be co-dried with a variety of alditols, such as sorbitol, mannitol, xylitol, maltitol, palatinit and hydrogenated starch hydrolyzates, and used in a sugar-free gum formulation. Co-drying refers to methods of co-crystallization and co-precipitation of oligofructose with other sugars and alditols, as well as co-drying by encapsulation, agglomeration and absorption with other sugars and alditols.

Co-drying by encapsulation, agglomeration and absorption can also include the use of encapsulating and agglomerating agents. Oligofructose may be mixed with other sugars or alditols prior to being redried by encapsulation or agglomeration, or may be used alone with the encapsulating and agglomerating agents. These agents modify the physical properties of the bulk sweetener and control its release from chewing gum. Since oligofructose is highly soluble in water as noted earlier, controlling the release of oligofructose modifies the texture and flavor of the chewing gum.

The three methods of use to obtain a delayed release of bulk sweetener are: (1) encapsulation by spray drying, fluid-bed coating, spray chilling and coacervation to give full or partial encapsulation, (2) agglomeration to give partial encapsulation and (3) fixation or entrapment/absorption which also gives partial encapsulation. These three methods, combined in any usable manner which physically isolates the bulk sweetener, reduces its dissolvability or slows down the release of bulk sweetener, are included in this invention.

Oligofructose may act as an encapsulating or agglomerating agent. Oligofructose may also be used to absorb other ingredients. Oligofructose may be able to encapsulate, agglomerate or entrap/absorb flavors and high-intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with oligofructose may improve the sweetener's shelf life.

Oligofructose may be used with other bulk sweeteners and in combination give unique properties. Oligofructose may be co-dried by various delayed release methods noted above with other bulk sweeteners like palatinose, sucrose, dextrose, lactose, maltose, fructose, corn syrup solids, sorbitol, mannitol, xylitol, maltitol, palatinit and hydrogenated starch hydrolyzates for use in sugar and sugar-free chewing gum. Ingredients, including flavors, co-dried, encapsulated, agglomerated or absorbed on oligofructose may show faster release. However, encapsulation of flavors with oligofructose may improve the shelf-life of the flavor ingredient like other bulking agents.

Other methods of treating the oligofructose bulk sweetener to physically isolate the sweetener from other chewing gum ingredients may also have some effect on its release rate and its effect on chewing gum flavor and texture. The bulk sweetener may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The bulk sweetener is dissolved in the center-fill liquid and the amount of bulk sweetener added to the center-fill liquid may be about 0.1% to about 20% by weight of the entire chewing gum formula. This method of using oligofructose bulk sweetener in chewing gum can allow for a lower usage level of the bulk sweetener, can give the bulk sweetener a smooth release rate, and can reduce or eliminate any possible reaction of the bulk sweetener with gum base, flavor components or other components, yielding improved shelf stability.

Another method of isolating the oligofructose bulk sweetener from other chewing gum ingredients is to add oligofructose to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises oligofructose bulk sweetener alone or in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of weight of the chewing gum composition. The amount of oligofructose bulk sweetener added to the rolling compound is about 0.5% to 100% of the rolling compound, or about 0.005% to about 5% of the chewing gum composition. This method of using oligofructose bulk sweetener in the chewing gum can allow a lower usage level of the bulk sweetener, can give the bulk sweetener a more controlled release rate, and can reduce or eliminate any possible reaction of the bulk sweetener with gum base, flavor components or other components, yielding improved shelf stability.

Another method of isolating oligofructose bulk sweetener is to use it in the coating/panning of a pellet chewing gum. Pellet or ball gum is prepared as conventional chewing gum, but formed into pellets that are pillow shaped or into balls. The pellets/balls can then be sugar coated or panned by conventional panning techniques to make a unique sugar-coated pellet gum.

Conventional panning procedures generally apply a liquid coating to a pellet, which is then solidified, usually by drying the coating. The coating layer is built up by successive coating and drying steps.

The bulk sweetener is very stable and highly water soluble, and can be easily added to a sugar solution prepared for sugar panning. Oligofructose may be added in a liquid form to the sucrose coating or any other sugar or alditol coating. Oligofructose can also be added as a powder blended with other powders often used in some types of conventional panning procedures. Using oligofructose sweetener isolates the sweetener from other gum ingredients and modifies its release rate in chewing gum. Levels of use of oligofructose may be about 1% to about 20% in the coating and about 0.5% to about 10% of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, xylitol, lactitol, palatinit and other new alditols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum, and gum tragacanth, insoluble carbonates like calcium carbonate or magnesium carbonate, and talc. Oligofructose also acts as a panning modifier with other panning materials to improve product quality. Antitack agents may also be added as panning modifiers, which allow the use of a variety of carbohydrates and sugar alcohols to be used in the development of new panned or coated gum products. Flavors may also be added with the sugar coating and with the oligofructose bulk sweetener to yield unique product characteristics.

Another method to improve coating processes using sugars or alditols is to add a powder coating after a liquid coating. The powder coating may include oligofructose, maltodextrin, gelatin, cellulose derivatives, starches, modified starches, vegetable gums and fillers like talc and calcium carbonate. This will reduce stickiness and allow a faster build-up of coating.

Oligofructose may be added to the liquid syrup and used as a panning modifier with other sugar and sugar alcohol syrups such as dextrose, sucrose, xylitol and palatinit. Oligofructose may act as a binder to, and film former for, the sugar or sugar alcohol coating.

The previously described oligofructose bulk sweetener may readily be incorporated into a chewing gum composition. The remainder of the chewing gum ingredients are noncritical to the present invention. That is, the untreated or coated particles of bulk sweetener can be incorporated into conventional chewing gum formulations in a conventional manner. The oligofructose bulk sweeteners may be used in a sugar-free or sugar chewing gum to modify the sweetness thereof. The bulk sweetener may be used in either regular chewing gum or bubble gum. Higher levels of oligofructose will reduce sweetness, thus allowing for its use in non-sweet flavored chewing gums such as snack flavors or savory flavors.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fill the role of bulking agents in the gum. The bulking agents generally comprise from about 5% to 90%, preferably from about 20% to about 80%, and most preferably from about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin and combinations thereof. Further, aqueous sweetener solutions such as those containing sorbitol, hydrogenated starch hydrolyzates, corn syrup and combinations thereof may be used as softeners and binding agents in gum.

As mentioned above, the oligofructose solids/syrup bulk sweetener of the present invention will most likely be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The oligofructose solids/syrup bulk sweetener of the present invention can also be used in combination with sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile and shelf-stability needed, the oligofructose solid/syrup bulk sweeteners of the present invention can also be used in combination with coated or uncoated high-intensity sweeteners or with high-intensity sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

The formulas listed in Table 1 comprise various sugar-type formulas in which oligofructose can be added to gum after it is dissolved in water and mixed with various aqueous solvents. Aspartame (APM), which is stabilized with oligofructose, may also be added to the formula. Generally, APM is added to the gum at a level of about 0.005% to about 1% of the gum composition.

TABLE 1

| | EX. 1 | EX. 2 | EX. 3 | EX. 4 | EX. 5 | EX. 6 | EX. 7 | EX. 8 |
|---|---|---|---|---|---|---|---|---|
| SUGAR | 55.6 | 56.6 | 55.6 | 47.0 | 53.0 | 53.0 | 55.5 | 47.0 |
| BASE | 19.2 | 19.2 | 19.2 | 19.2 | 19.2 | 19.2 | 19.2 | 19.2 |
| CORN SYRUP | 12.8 | 1.8 | 8.8 | 2.8 | 6.8 | 6.8 | 0.0 | 2.8 |
| PEPPERMINT FLAVOR | 0.9 | 0.9 | 0.9 | 0.9 | 0.9 | 0.9 | 0.9 | 0.9 |
| GLYCERIN | 1.4 | 1.4 | 1.4 | 0.0 | 0.0 | 0.0 | 1.4 | 0.0 |
| LIQUID/RAFTILOSE BLEND | 10.0 | 20.0 | 14.0 | 30.0 | 20.0 | 20.0 | 22.9 | 30.0 |
| APM | 0.1 | 0.1 | 0.1 | 0.1 | 0.1 | 0.1 | 0.1 | 0.1 |

Example 1

Raftilose powder can be added directly to the gum.

Example 2

A 100 gram portion of Raftilose can be dissolved in 100 grams of water at 40° C. making a 50% solution and added to gum.

Example 3

Raftilose syrup at 80% solids can be added directly to the gum.

Example 4

A blend of 100 grams of Raftilose and 100 grams of water is mixed at 40° C. To this is added 100 grams of glycerin to give a mixture of 33% Raftilose, 33% water and 33% glycerin, and added to gum.

Example 5

To 140 grams of Raftilose syrup at 70% solids is added 60 grams of glycerin to give a 70% Raftilose syrup with 30% glycerin, and added to gum.

Example 6

To 140 grams of Raftilose syrup of 70% solids is added 60 grams of propylene glycol giving a 70% Raftilose syrup with 30% propylene glycol and added to gum.

Example 7

To 140 grams of Raftilose syrup at 70% solids is added 89 grams of corn syrup and blended, giving a mixture of 61% Raftilose syrup and 39% corn syrup.

Example 8

To a 200 gram quantity of corn syrup is added 100 grams of glycerin. To this mixture is added 75 grams of Raftilose and blended at 50° C. This mixture is added to gum.

In the next examples of sugar gum formulations, oligofructose can be dissolved in water and emulsifiers can be added to the aqueous solution. Example solutions can be prepared by dissolving 15 grams of oligofructose in 70 grams water and adding 15 grams of emulsifiers of various hydrophilic-lipophilic balance (HLB) values to the solution. The mixtures can then be used in the following formulas. (Note: the solution of Example 9 does not contain any emulsifier.)

TABLE 2

|  | EX. 9 | EX. 10 | EX. 11 | EX. 12 | EX. 13 | EX. 14 |
|---|---|---|---|---|---|---|
| SUGAR | 50.7 | 50.7 | 50.7 | 50.7 | 50.7 | 50.7 |
| BASE | 19.2 | 19.2 | 19.2 | 19.2 | 19.2 | 19.2 |
| CORN SYRUP | 12.8 | 12.8 | 12.8 | 12.8 | 12.8 | 12.8 |
| GLYCERIN | 1.4 | 1.4 | 1.4 | 1.4 | 1.4 | 1.4 |
| DEXTROSE MONOHYDRATE | 9.9 | 9.9 | 9.9 | 9.9 | 9.9 | 9.9 |
| PEPP. FLAVOR | 0.9 | 0.9 | 0.9 | 0.9 | 0.9 | 0.9 |
| APM | 0.1 | 0.1 | 0.1 | 0.1 | 0.1 | 0.1 |
| BULK SWEETENER/ EMULSIFIER/ WATER MIXTURE | 5.0 | 5.0 | 5.0 | 5.0 | 5.0 | 5.0 |
|  | None | HLB = 2 | HLB = 4 | HLB = 6 | HLB = 9 | HLB = 12 |

Examples 15–20

The same as the formulations made in Examples 9–14, respectively, except that the flavor can be mixed together with the aqueous bulk sweetener solution and emulsified before adding the mixture to the gum batch.

The following Tables 3 through 10 give examples of gum formulations that demonstrate formula variations in which oligofructose, in the form of Raftilose (syrup or powder), may be used. Raftiline powder may be used in all of the formulations in the following examples at about half the level indicated for Raftilose. Formulas with high levels of oligofructose may also contain aspartame (APM), which is stabilized with oligofructose.

Examples 21–25 in Table 3 demonstrate the use of oligofructose in low-moisture sugar formulations showing less than 2% theoretical moisture:

TABLE 3

|  | EX. 21 | EX. 22 | EX. 23 | EX. 24 | EX. 25 |
|---|---|---|---|---|---|
| SUGAR | 57.9 | 53.9 | 46.9 | 23.0 | 0.0 |
| GUM BASE | 19.2 | 19.2 | 19.2 | 19.2 | 19.2 |
| CORN[a] SYRUP | 6.0 | 6.0 | 6.0 | 6.0 | 4.0 |
| DEXTROSE MONOHYDRATE | 10.0 | 10.0 | 10.0 | 10.0 | 10.0 |
| LACTOSE | 0.0 | 0.0 | 0.0 | 5.0 | 5.0 |
| GLYCERIN[b] | 5.0 | 5.0 | 6.9 | 10.7 | 10.6 |
| FLAVOR | 0.9 | 0.9 | 0.9 | 0.9 | 0.9 |
| RAFTILOSE | 1.0 | 5.0 | 10.0 | 25.0 | 50.0 |
| APM | — | — | 0.1 | 0.2 | 0.3 |

[a]Corn syrup in evaporated to 85% solids, 15% moisture
[b]Glycerin and syrup may be blended and co-evaporated Examples 26–30 in Table 4 demonstrate the use of oligofructose in medium-moisture sugar formulations having about 2% to about 5% moisture.

TABLE 4

|  | EX. 26 | EX. 27 | EX. 28 | EX. 29 | EX. 30 |
|---|---|---|---|---|---|
| SUGAR | 52.5 | 46.5 | 40.5 | 20.0 | 0.0 |
| GUM BASE | 19.2 | 19.2 | 19.2 | 19.2 | 19.2 |
| CORN[a] SYRUP | 15.0 | 15.0 | 14.9 | 18.3 | 18.2 |
| DEXTROSE MONOHYDRATE | 10.0 | 10.0 | 10.0 | 10.0 | 5.0 |
| GLYCERIN[b] | 1.4 | 3.4 | 4.4 | 6.4 | 6.4 |
| FLAVOR | 0.9 | 0.9 | 0.9 | 0.9 | 0.9 |
| RAFTILOSE | 1.0 | 5.0 | 10.0 | 25.0 | 50.0 |
| APM | — | — | 0.1 | 0.2 | 0.3 |

[a]Corn syrup in evaporated to 85% solids, 15% moisture
[b]Glycerin and syrup may be blended and co-evaporated Examples 31–35 in Table 5 demonstrate the use of oligofructose in high-moisture sugar formulations having more than about 5% moisture.

TABLE 5

|  | EX. 31 | EX. 32 | EX. 33 | EX. 34 | EX. 35 |
|---|---|---|---|---|---|
| SUGAR | 50.0 | 44.0 | 38.0 | 20.0 | 0.0 |
| GUM BASE | 24.0 | 24.0 | 24.0 | 24.0 | 24.0 |

TABLE 5-continued

|  | EX. 31 | EX. 32 | EX. 33 | EX. 34 | EX. 35 |
|---|---|---|---|---|---|
| CORN SYRUP | 24.0 | 24.0 | 24.0 | 24.4 | 19.3 |
| GLYCERIN | 0.0 | 2.0 | 2.9 | 5.4 | 5.4 |
| FLAVOR | 1.0 | 1.0 | 1.0 | 1.0 | 1.0 |
| RAFTILOSE | 1.0 | 5.0 | 10.0 | 25.0 | 50.0 |
| APM | — | — | 0.1 | 0.2 | 0.3 |

Examples 36–40 in Table 6 and Examples 41–50 in Tables 7 and 8 demonstrate the use of oligofructose in low- and high-moisture gums that are sugar-free. Low-moisture gums have less than about 2% moisture, and high-moisture gums have greater than 2% moisture.

TABLE 6

|  | EX. 36 | EX. 37 | EX. 38 | EX. 39 | EX. 40 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| MANNITOL | 12.0 | 12.0 | 12.0 | 12.0 | 13.0 |
| GLYCERIN | 10.0 | 9.9 | 9.8 | 9.7 | 9.6 |
| FLAVOR | 1.5 | 1.5 | 1.5 | 1.5 | 1.5 |
| RAFTILOSE | 1.0 | 5.0 | 10.0 | 25.0 | 50.0 |
| APM | — | 0.1 | 0.2 | 0.3 | 0.4 |

TABLE 7

|  | EX. 41 | EX. 42 | EX. 43 | EX. 44 | EX. 45 |
|---|---|---|---|---|---|
| BASE | 25.5 | 25.5 | 25.5 | 25.5 | 25.5 |
| SORBITOL | 50.0 | 46.0 | 39.0 | 23.0 | 0.0 |
| SORBITOL LIQUID* | 10.0 | 10.0 | 10.0 | 10.0 | 11.0 |
| MANNITOL | 10.0 | 10.0 | 10.0 | 10.0 | 5.0 |
| GLYCERIN | 2.0 | 1.9 | 3.8 | 4.7 | 6.6 |
| FLAVOR | 1.5 | 1.5 | 1.5 | 1.5 | 1.5 |
| RAFTILOSE | 1.0 | 5.0 | 10.0 | 25.0 | 50.0 |
| APM | — | 0.1 | 0.2 | 0.3 | 0.4 |

*Sorbitol liquid contains 70% sorbitol, 30% water

TABLE 8

|  | EX. 46 | EX. 47 | EX. 48 | EX. 49 | EX. 40 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| HSH SYRUP* | 10.0 | 10.0 | 10.0 | 10.0 | 10.0 |
| MANNITOL | 8.0 | 7.9 | 7.8 | 7.7 | 8.6 |
| GLYCERIN** | 4.0 | 4.0 | 4.0 | 4.0 | 4.0 |
| FLAVOR | 1.5 | 1.5 | 1.5 | 1.5 | 1.5 |
| RAFTILOSE | 1.0 | 5.0 | 10.0 | 25.0 | 50.0 |
| APM | — | 0.1 | 0.2 | 0.3 | 0.4 |

*Lycasin brand hydrogenated starch hydrolyzate syrup
**Glycerin and HSH syrup may be blended or co-evaporated Table 9 shows sugar chewing gum formulations that can be made with oligofructose and various other types of sugars.

TABLE 9

|  | EX. 51 | EX. 52 | EX. 53 | EX. 54 | EX. 55 | EX. 56 | EX. 57 | EX. 58 | EX. 59 | EX. 60 | EX. 61 | EX. 62 |
|---|---|---|---|---|---|---|---|---|---|---|---|---|
| GUM BASE | 19.2 | 19.2 | 19.2 | 19.2 | 19.2 | 19.2 | 19.2 | 19.2 | 19.2 | 19.2 | 19.2 | 19.2 |
| SUCROSE | 44.4 | 21.2 | 39.4 | 16.2 | 29.4 | 16.2 | 29.4 | 16.2 | 29.4 | 16.2 | 37.4 | 19.2 |
| GLYCERIN | 1.4 | 4.4 | 1.4 | 4.4 | 1.4 | 4.4 | 1.4 | 4.4 | 1.4 | 4.4 | 1.4 | 4.4 |
| CORN SYRUP | 14.0 | 14.0 | 14.0 | 14.0 | 14.0 | 14.0 | 14.0 | 14.0 | 14.0 | 14.0 | 11.0 | 11.0 |
| DEXTROSE | 5.0 | 5.0 | — | — | 10.0 | 5.0 | 10.0 | 5.0 | 10.0 | 5.0 | 10.0 | 5.0 |
| LACTOSE | 5.0 | 5.0 | 10.0 | 10.0 | — | — | — | — | — | — | — | — |
| FRUCTOSE | 5.0 | 5.0 | 10.0 | 10.0 | 10.0 | 5.0 | 10.0 | 5.0 | 10.0 | 5.0 | 5.0 | 5.0 |
| INVERT SUGAR | — | — | — | — | 10.0 | 10.0 | 10.0 | 10.0 | — | — | 5.0 | 5.0 |
| MALTOSE | — | — | — | — | — | — | — | — | 10.0 | 10.0 | — | — |
| CORN SYRUP SOLIDS | — | — | — | — | — | — | — | — | — | — | 5.0 | 5.0 |
| PEP. FLAVOR | 0.9 | 0.9 | 0.9 | 0.9 | 0.9 | 0.9 | 0.9 | 0.9 | 0.9 | 0.9 | 0.9 | 0.9 |
| RAFTILOSE | 5.0 | 25.0 | 5.0 | 25.0 | 5.0 | 25.0 | 5.0 | 25.0 | 5.0 | 25.0 | 5.0 | 25.0 |
| APM | 0.1 | 0.3 | 0.1 | 0.3 | 0.1 | 0.3 | 0.1 | 0.3 | 0.1 | 0.3 | 0.1 | 0.3 |

Any of the sugars may be combined with oligofructose and co-dried to form unique combinations such as:

Example 63

Dextrose and Raftilose can be dissolved in water in a 2:1 ratio of dextrose:Raftilose and co-dried or co-precipitated and used in the formulas in Table 9.

Example 64

Raftilose and sucrose can be dissolved in water in a 1:1 ratio and co-dried or co-precipitated and used in the formulas in Table 9.

Example 65

Raftilose, sucrose and dextrose can be dissolved in water in a 1:1:1 ratio and co-dried or co-precipitated and used in the formulas in Table 9.

Example 66

Raftilose, sucrose, dextrose and fructose can be dissolved in water at 25% of each ingredient and co-dried, and used in the formulas in Table 9.

Example 67

Raftilose, dextrose, fructose and lactose can be dissolved in water at 25% of each ingredient and co-dried, and used in the formulas in Table 9.

Example 68

Raftilose, dextrose, maltose and corn syrup solids can be dissolved in water at 25% of each ingredient and co-dried, and used in the formulas in Table 9.

Example 69

Raftilose, sucrose, dextrose, maltose and fructose can be dissolved in water at 20% of each ingredient and co-dried, and used in the formulas in Table 9.

Multiple combinations of oligofructose with other sugars can be made in solution to form liquid concentrates that do not need to be co-dried, such as:

Example 70

Raftilose, corn syrup and glycerin can be dissolved in water at a ratio of 1:1:1, evaporated to a thick syrup and used in the formulas in Table 9.

Example 71

Raftilose, dextrose, fructose and invert syrup may be dissolved in water at 25% of each ingredient and evaporated to a thick syrup and used in the formulas in Table 9.

Example 72

Raftilose, dextrose, maltose and corn syrup solids may be dissolved in water at 25% of each component and evaporated to a thick syrup and used in the formulas in Table 9.

Example 73

Glycerin is added to Example 71 at a ratio of 4:1 syrup to glycerin and evaporated to a thick syrup, and used in the formulas in Table 9.

Example 74

Glycerin is added to Example 72 at a ratio of 2:1 syrup to glycerin and evaporated to a thick syrup, and used in the formulas in Table 9.

Table 10 shows chewing gum formulations that are free of sugar. These formulations can use a wide variety of other non-sugar alditols.

TABLE 10

| | EX. 75 | EX. 76 | EX. 77 | EX. 78 | EX. 79 | EX. 80 |
|---|---|---|---|---|---|---|
| GUM BASE | 25.5 | 25.5 | 25.5 | 25.5 | 25.5 | 25.5 |
| GLYCERIN | 1.9 | 3.7 | 1.9 | 3.7 | 1.9 | 4.7 |
| SORBITOL | 44.0 | 12.0 | 34.0 | 7.0 | 28.0 | — |
| MANNITOL | — | 10.0 | 10.0 | 10.0 | 10.0 | 3.0 |
| SORBITOL LIQUID | 17.0 | 17.0 | — | — | — | — |
| LYCASIN HSH SYRUP | — | — | 17.0 | 12.0 | 8.0 | 10.0 |
| MALTITOL | — | — | — | 10.0 | — | — |
| XYLITOL | — | — | — | — | 15.0 | 15.0 |
| LACTITOL | — | — | — | — | — | — |
| PALATINIT | — | — | — | — | — | — |
| FLAVOR | 1.5 | 1.5 | 1.5 | 1.5 | 1.5 | 1.5 |
| RAFTILOSE | 10.0 | 30.0 | 10.0 | 30.0 | 10.0 | 40.0 |
| APM | 0.1 | 0.3 | 0.1 | 0.3 | 0.1 | 0.3 |

| | EX. 81 | EX. 82 | EX. 83 | EX. 84 | EX. 85 | EX. 86 |
|---|---|---|---|---|---|---|
| GUM BASE | 25.5 | 25.5 | 25.5 | 25.5 | 25.5 | 25.5 |
| GLYCERIN | 7.9 | 7.7 | 7.9 | 7.7 | 7.7 | 4.7 |
| SORBITOL | 32.0 | 7.0 | 22.0 | 5.0 | 5.0 | — |
| MANNITOL | 8.0 | 8.0 | 8.0 | — | — | — |
| SORBITOL LIQUID | 5.0 | — | — | — | — | — |
| LYCASIN HSH SYRUP | — | 5.0 | 5.0 | 5.0 | 10.0 | 10.0 |
| MALTITOL | — | 5.0 | — | — | — | — |
| XYLITOL | — | — | — | 15.0 | — | — |
| LACTITOL | 10.0 | 10.0 | 10.0 | — | — | — |
| PALATINIT | — | — | 10.0 | 10.0 | 25.0 | 18.0 |
| FLAVOR | 1.5 | 1.5 | 1.5 | 1.5 | 1.5 | 1.5 |
| RAFTILOSE | 10.0 | 30.0 | 10.0 | 30.0 | 25.0 | 40.0 |
| APM | 0.1 | 0.3 | 0.1 | 0.3 | 0.3 | 0.3 |

Any of the alditols can be combined with oligofructose and co-dried to form unique combinations, such as:

Example 87

Raftilose and sorbitol can be dissolved in water in a ratio of 2:1 sorbitol:Raftilose and co-dried and used in formulas in Table 10.

Example 88

Raftilose, sorbitol and mannitol can be dissolved in water at a ratio of 1:1:1, co-dried, and used in appropriate formulas in Table 10.

Example 89

Raftilose, mannitol and xylitol can be dissolved in water at a ratio of 1:1:1, co-dried, and used in appropriate formulas in Table 10.

Example 90

Raftilose, sorbitol and lactitol can be dissolved in water at a ratio of 1:1:1, co-dried, and used in appropriate formulas in Table 10.

Example 91

Raftilose, palatinit and sorbitol can be dissolved in water at a ratio of 1:1:1, co-dried, and used in appropriate formulas in Table 10.

Example 92

Raftilose and palatinit can be dissolved in water at a ratio of 1:1, co-dried, and used in appropriate formulas in Table 10.

Example 93

Raftilose, sorbitol, maltitol and xylitol may be blended at 25% of each ingredient and dissolved in water, co-dried, and used in appropriate formulas in Table 10.

Multiple combinations of oligofructose with the various alditols can be made in solution to form liquid concentrates that do not need to be co-dried, such as:

Example 94

Raftilose, sorbitol, maltitol and Lycasin brand HSH syrup may be dissolved in water at 25% of each ingredient, evaporated to a thick syrup and used in the appropriate formulas in Table 10.

Example 95

Raftilose, xylitol, sorbitol and Lycasin brand HSH syrup can be dissolved in water at 25% of each ingredient, evaporated to a thick syrup and used in the formulas in Table 10.

Example 96

Raftilose, sorbitol, lactitol and Lycasin brand HSH syrup can be dissolved in water at 25% of each ingredient, evaporated to a thick syrup and used in the formulas in Table 10.

Example 97

Raftilose, Lycasin brand HSH syrup and glycerin can be dissolved in water at a ratio of 1:1:1, evaporated to a thick syrup and used in the formulas in Table 10.

Example 98

Glycerin is added to Example 94 at a ratio of 4:1 syrup to glycerin, evaporated to a thick syrup and used in formulas in Table 10.

Example 99

Glycerin is added to Example 95 at a ratio of 4:1 syrup to glycerin, evaporated to a thick syrup and used in the formulas in Table 10.

Example 100

Glycerin is added to Example 96 at a ratio of 4:1 syrup to glycerin, evaporated to a thick syrup and used in formulas in Table 10.

Other high-intensity sweeteners such as acesulfame K, or the salts of acesulfame, cyclamate and its salts, saccharin and its salts, alitame, sucralose, thaumatin, monellin, dihydrochalcones, stevioside, glycyrrhizin and combinations thereof may be used in any of the Examples listed in Tables 3, 4, 5, 6, 7, 8, 9 and 10. Since oligofructose has less sweetness than some of the sugars used in sugar gum, and some of the alditols in sugar-free gum, a high-intensity sweetener may be need to obtain the proper level of sweetness.

High-intensity sweeteners may also be modified to control their release in chewing gum formulations containing oligofructose. This can be controlled by various methods of encapsulation, agglomeration, absorption, or a combination of methods to obtain either a fast or slow release of the sweetener. Sweetener combinations, some of which may be synergistic, may also be included in the gum formulations containing oligofructose. Oligofructose may also be used to encapsulate, agglomerate, absorb or entrap any high intensity sweetener to control its release.

The following examples show the use of high-intensity sweeteners in chewing gum formulations with oligofructose.

Example 101

Alitame at a level of 0.03% may be added to any of the formulas in Tables 3 through 10 by replacing 0.03% of the Raftilose.

Example 102

Sucralose at a level of 0.07% may be added to any of the formulas in Tables 3 through 10 by replacing 0.07% of the Raftilose.

Example 103

Thaumatin at a level of 0.02% may be added to any of the formulas in Tables 3 through 10 by replacing 0.02% of the Raftilose.

Example 104

Glycyrrhizin at a level of 0.4% may be added to any of the formulas in Tables 3 through 10 by replacing 0.4% of the Raftilose.

High-intensity sweeteners may also be combined with other high-intensity sweeteners, with or without encapsulation, agglomeration or absorption, and used in chewing gums of the present invention. Examples are:

Example 105

Aspartame and acesulfame K at a 1:1 ratio may be added to any of the formulas in Tables 3 through 10 at a level of 0.15% by replacing 0.15% of the Raftilose.

Example 106

Aspartame and alitame at a ratio of 9:1 aspartame:alitame may be added to any of the formulas in Tables 3 through 10 at a level of 0.1% by replacing 0.1% of the Raftilose.

Example 107

Aspartame and thaumatin at a ratio of 9:1 aspartame:thaumatin can be added to any of the formulas in Tables 3 through 10 at a level of 0.1% by replacing 0.1% of the Raftilose.

Example 108

Sucralose and alitame in a ratio of 3:1 sucralose:alitame can be added to any of the formulas in Tables 3 through 10 at a level of 0.05% by replacing 0.05% of the Raftilose.

Example 109

Alitame and glycyrrhizin in a ratio of 1:12 alitame:glycyrrhizin can be added to any of the formulas in Tables 3 through 10 at a level of 0.1% by replacing 0.1% of the Raftilose.

Example 110

Aspartame and glycyrrhizin in a ratio of 1:14 aspartame:glycyrrhizin can be added to any of the formulas in Tables 3 through 10 at a level of 0.3% by replacing 0.3% of the Raftilose.

As discussed above, the various types of oligofructose ingredients that are available are Raftilose 30, 60, 85, and 95 clear syrup and 95 powder. Raftiline is available in powder form. These materials may be used as the exclusive sweetener in a variety of chewing gum formulations, as in Tables 11 and 12. The formulas with oligofructose and APM will show improved APM stability.

TABLE 11

| | EX. 111 | EX. 112 | EX. 113 | EX. 114 | EX. 115 |
|---|---|---|---|---|---|
| GUM BASE | 19.2 | 25.5 | 25.5 | 25.5 | 40.0 |
| GLYCERIN | 4.0 | 4.0 | 7.0 | 7.0 | 7.0 |
| RAFTILOSE 95 POWDER | 55.8 | 49.0 | 46.0 | 46.0 | 30.5 |
| RAFTILOSE 95 SYRUP* | 10.0 | 15.0 | 5.0 | — | 10.0 |
| RAFTILOSE 60 SYRUP* | 10.0 | 5.0 | 15.0 | 20.0 | 10.0 |
| FLAVOR | 1.0 | 1.5 | 1.5 | 1.5 | 2.5 |

*Raftilose 95 powder, Raftilose 95 syrup and Raftilose 60 syrup may also be preblended with glycerin and coevaporated to reduce moisture.

TABLE 12

| | EX. 116 | EX. 117 | EX. 118 | EX. 119 | EX. 120 | EX. 121 |
|---|---|---|---|---|---|---|
| GUM BASE | 25.5 | 25.5 | 25.5 | 25.5 | 50.0 | 70.0 |
| GLYCERIN | 2.0 | 7.0 | 7.0 | 15.0 | 2.0 | 1.0 |
| RAFTILOSE 95 POWDER | 51.0 | 56.0 | 46.0 | 43.0 | 35.5 | 20.0 |
| RAFTILOSE 95 SYRUP | 20.0 | 10.0 | 5.0 | — | 10.0 | 4.0 |
| RAFTILOSE 60 SYRUP | — | — | 15.0 | 15.0 | — | 2.0 |
| FLAVOR | 1.5 | 1.5 | 1.5 | 1.5 | 2.5 | 3.0 |

The formulations in Tables 11 and 12 do not contain other sugars or alditols. These formulations will give unique texture and flavor attributes. These formulations may also contain high-intensity, artificial sweeteners, from about 0.02% to about 0.1% for sweeteners like alitame, thaumatin and dihydrochalcones, and from about 0.1% to about 0.3% for sweeteners like aspartame, sucralose, acesulfame and saccharin. The formulations in Tables 11 and 12, without the other types of sugars and alditols, will also have good non-cariogenic and low caloric properties.

Oligofructose may also be codried with high intensity, artificial sweeteners by spray drying, fluid bed coating, spray congealing or agglomeration, and used in the formulations in Tables 11 and 12 at active levels of the various high intensity sweeteners noted above.

Examples 122–125

The following gum formulations were made:

|  | EX. 122 | EX. 123 | EX. 124 | EX. 125 |
|---|---|---|---|---|
| BASE | 27.0 | 27.0 | 27.0 | 27.0 |
| SORBITOL | 40.2 | 38.7 | 32.5 | 20.9 |
| MANNITOL | 12.0 | 11.5 | 9.7 | 6.3 |
| GLYCERIN | 8.1 | 8.1 | 8.1 | 8.1 |
| SORBITOL LIQUID | 11.0 | 11.0 | 11.0 | 11.0 |
| PEPPERMINT FLAVOR | 1.3 | 1.3 | 1.3 | 1.3 |
| COLOR | 0.1 | 0.1 | 0.1 | 0.1 |
| APM | 0.3 | 0.3 | 0.3 | 0.3 |
| RAFTILOSE 95 POWDER | 0 | 2.0 | 10.0 | 25.0 |

These formulas were made in a conventional lab mixer in a conventional manner on a lab scale and formed into square pellets. Samples of each formula were placed in six sealed pouches and stored at 85° F. for 0, 1, 2, 4, 6 and 8 weeks. Samples were then removed and analyzed for APM to determine degradation. The test results are shown in FIG. 1. As shown, after eight weeks of storage at 85° F., at levels of 10% or greater of oligofructose, there was a significant increase in the stability of APM. Even at 2% oligofructose (Example 123), there was over a 10% increase in the amount of APM remaining after eight weeks of storage compared to the sample with no oligofructose (Example 122).

Examples 126–132

The following gum formulations were made:

|  | EX. 126 | EX. 127 | EX. 128 | EX. 129 | EX. 130 | EX. 131 | EX. 132 |
|---|---|---|---|---|---|---|---|
| BASE | 24.7 | 24.7 | 24.7 | 24.7 | 24.7 | 34.7 | 24.7 |
| SORBITOL | 50.0 | 50.0 | 45.0 | 35.0 | 10.0 | 35.0 | 10.0 |
| MANNITOL | 9.4 | 7.0 | 9.4 | 9.4 | 9.4 | 7.0 | 7.0 |
| GLYCERIN | 2.0 | 2.0 | 2.0 | 2.0 | 2.0 | 2.0 | 2.00 |
| LECITHIN | 0.2 | 0.2 | 0.2 | 0.2 | 0.2 | 0.2 | 0.2 |
| PEPPERMINT FLAVOR | 1.4 | 1.4 | 1.4 | 1.4 | 1.4 | 1.4 | 1.4 |
| APM | 0.3 | 0.3 | 0.3 | 0.3 | 0.3 | 0.3 | 0.3 |
| LYCASIN | — | 14.4 | — | — | — | 14.4 | 14.4 |
| SORBITOL LIQUID | 12.0 | — | 12.0 | 12.0 | 12.0 | — | — |
| RAFTILOSE 95 POWDER | — | — | 5.0 | 15.0 | 40.0 | 15.0 | 40.0 |

Figure 2:
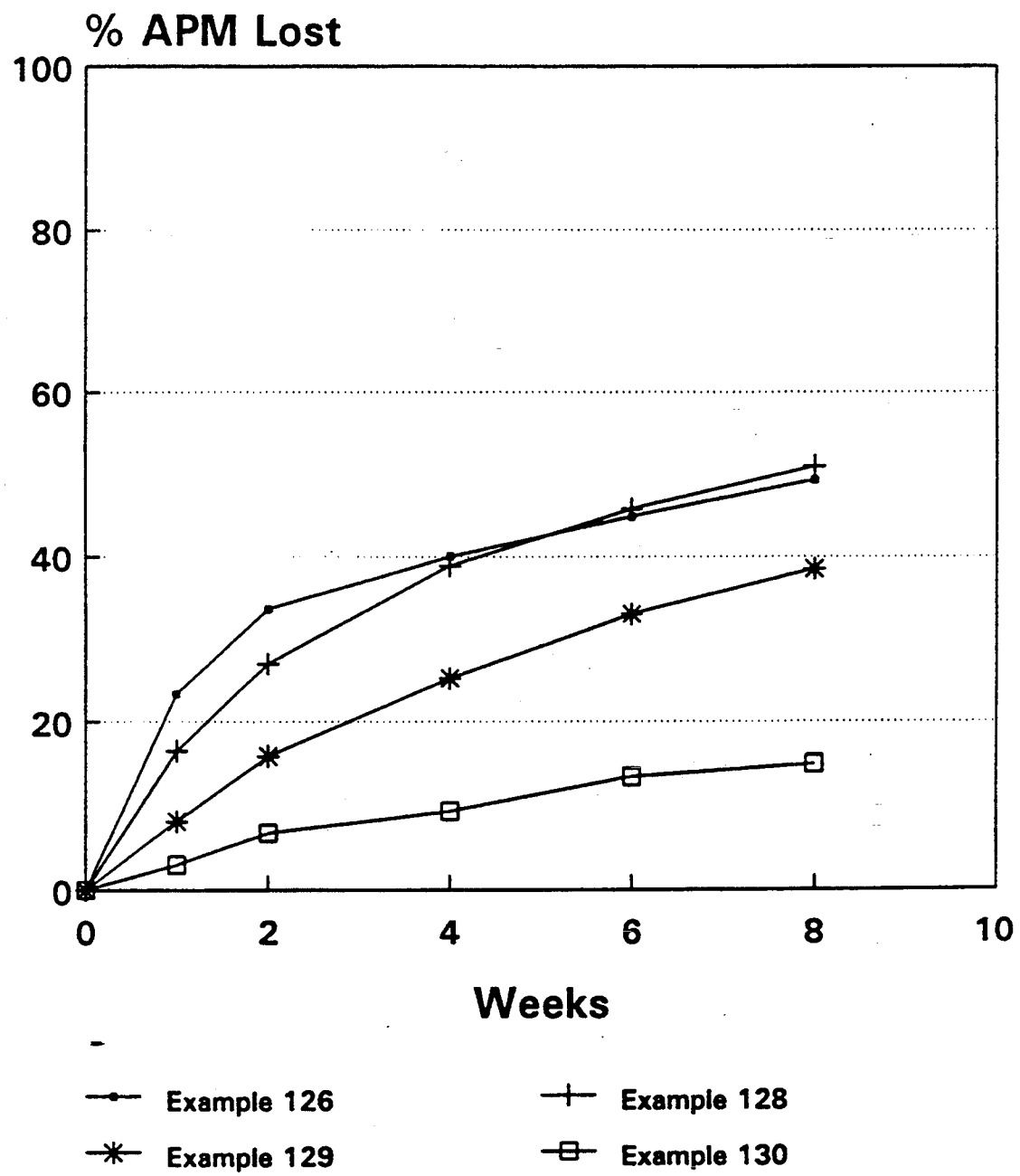
FIG. 2 shows test results of aspartame stability for gum made with sorbitol liquid and oligofructose.
Figure 3:
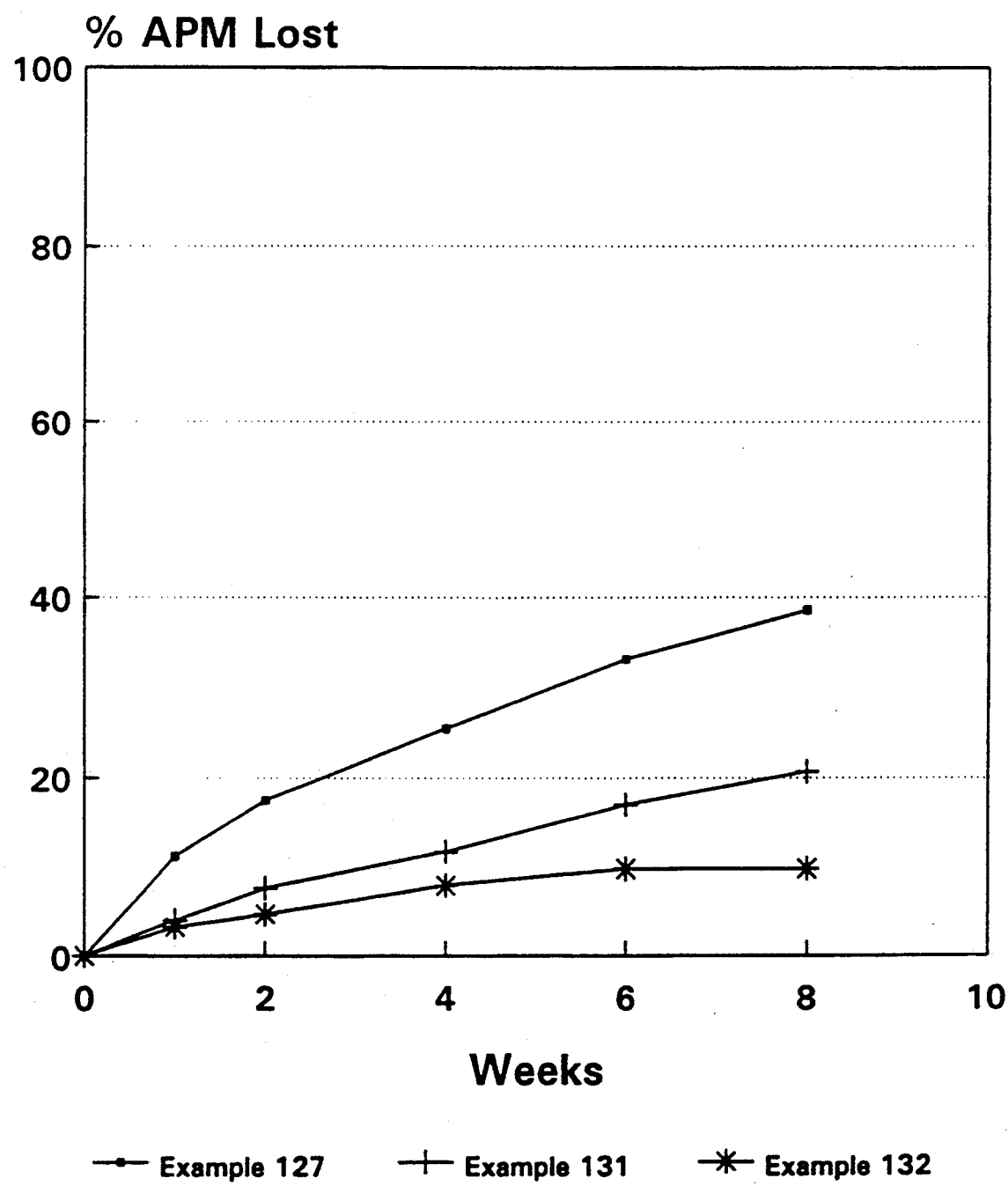
FIG. 3 shows test results of aspartame stability for gum made with Lycasin brand HSH syrup and oligofructose.

These formulas were made in a conventional lab mixer in a conventional manner and formed into square pellets. Samples of each formula were placed in six sealed pouches and stored at 85° F. for 0, 1, 2, 4, 6 and 8 weeks. Samples were then removed and analyzed for APM to determine degradation. The test results for Examples 126, 128, 129 and 130 are shown in FIG. 2 for gum made with sorbitol liquid, and the test results for Examples 127, 131 and 132 are shown in FIG. 3 for gum made with Lycasin brand HSH syrup. Results show that in both types of formulations, using 15% or more oligofructose improves APM stability significantly as compared to when an oligofructose material is not used or used at a level of only 5%. As seen in both FIGS. 2 and 3, after eight weeks of storage at 85° F., there was more than a 5% decrease, in fact over a 20% decrease, in the amount of aspartame that decomposed in the gum formulas that included 15% or more oligofructose.

Also, Examples 130 and 132 produced a gum composition in which the oligofructose were effective such that after eight weeks of storage, over 80% of the unencapsulated aspartame originally formulated in the gum composition remained undecomposed.

Example 133

The following sugar gum center formulation was made:

|  | % |
|---|---|
| Base | 24.8 |
| Sugar | 52.0 |
| Corn Syrup | 22.4 |
| Peppermint Flavor | 0.8 |
|  | 100 |

The formulation was made in a 25 gallon standard gum mixer and sheeted as rectangular pellets for coating tests.

Two sugar solutions were prepared for use in coating tests. They are:

| A) 750 grams sugar | B) 650 grams sugar |
|---|---|
| 250 grams water | 350 grams water |
| 30 grams Raftilose 95 powder | |

In a 12 inch lab coating pan, 1,000 grams of the above centers were coated with Solution A up to a level of 20% coating, then coating continued with Solution B until a 33% coating was achieved. As coating progressed, ten pieces were weighed to determine the coating weight increase to 20%, then 33%. During the coating process, Solution A was tacky like other types of coatings which contain gum arabic, maltodextrins or modified starches, but it is anticipated that Raftilose will give good shelf life protection. The final coated product had a hard, crunchy shell that was white in color. The flavor had a creamy character comparable to a typical sugar-coated pellet gum.

Examples 134–137

The following gum formulations were made:

|  | EX. 134 | EX. 135 | EX. 136 | EX. 137 |
|---|---|---|---|---|
| BASE | 24.7 | 24.7 | 24.7 | 24.7 |
| SORBITOL | 35.0 | 35.0 | 35.0 | 35.0 |
| MANNITOL | 9.4 | 9.4 | 9.4 | 9.4 |
| GLYCERIN | 2.0 | 5.0 | 8.0 | 11.0 |
| LECITHIN | 0.2 | 0.2 | 0.2 | 0.2 |
| PEPPERMINT FLAVOR | 1.4 | 1.4 | 1.4 | 1.4 |
| APM | 0.3 | 0.3 | 0.3 | 0.3 |
| SORBITOL LIQUID | 12.0 | 9.0 | 6.0 | 3.0 |
| RAFTILOSE 95 | 15.0 | 15.0 | 15.0 | 15.0 |

Figure 4:
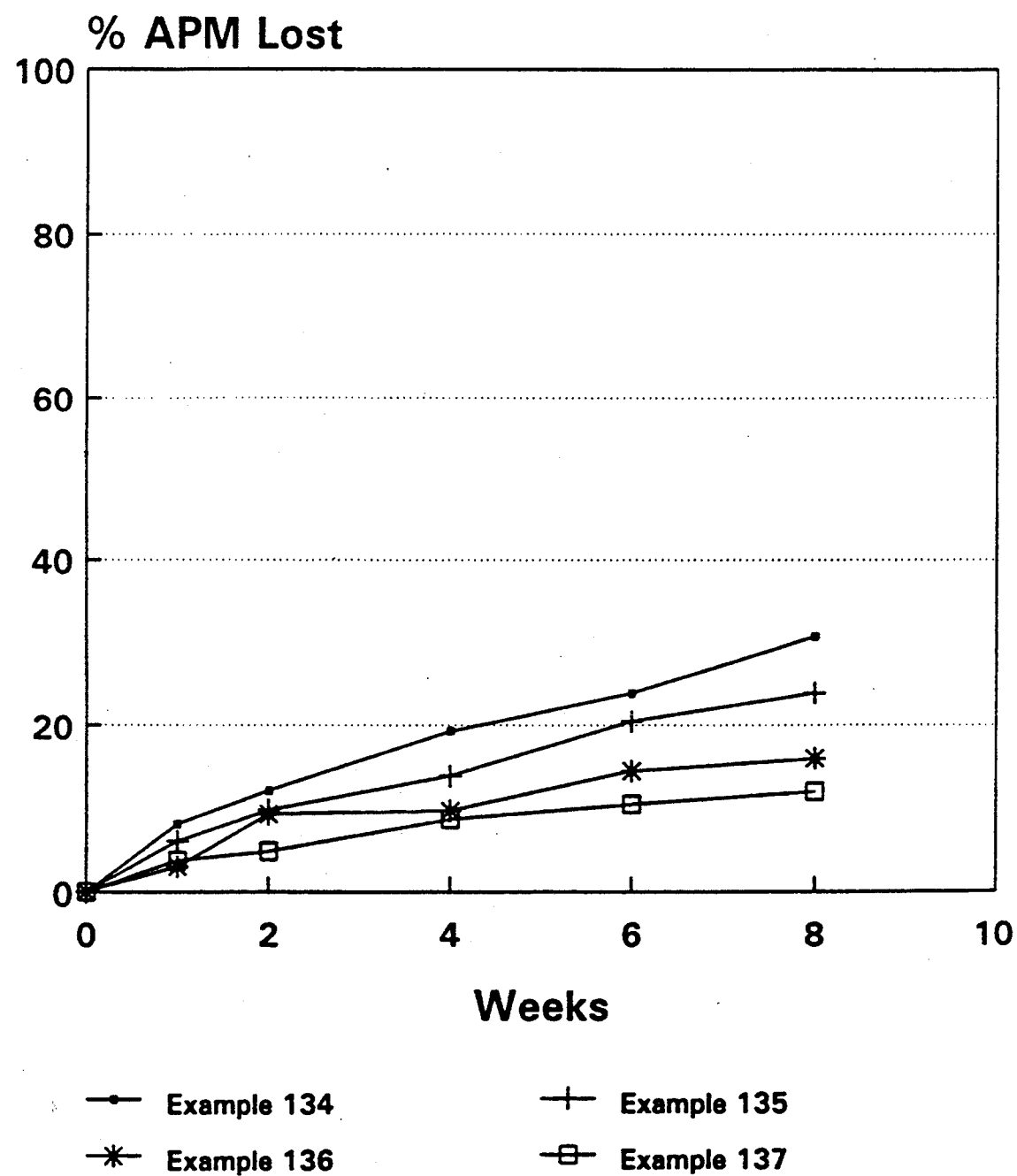
FIG. 4 shows test results of aspartame stability for gum made with various levels of sorbitol liquid and 15% oligofructose.

These formulas were made in a conventional lab mixer in a conventional manner and formed into square pellets. Samples of each formula were placed in six sealed pouches and stored at 85° F. for 0, 1, 2, 4, 6 and 8 weeks. Samples were then removed and analyzed for APM to determine degradation. The test results, shown in FIG. 4, demonstrate that at 15% oligofructose, all of the formulas had fairly good aspartame stability, with over 60% of the original aspartame still available after eight weeks of storage. As an aside, the results also demonstrate how reduced levels of sorbitol liquid, and consequentially reduced levels of water, gives further improved stability of APM.

Examples 138–141

A 75% solids solution of Raftilose 95 was prepared by mixing 750 grams Raftilose 95 with 250 grams water and used in the following gum formulations:

|  | EX. 138 | EX. 139 | EX. 140 | EX. 141 |
|---|---|---|---|---|
| BASE | 19.7 | 19.7 | 19.7 | 19.7 |
| SUCROSE | 54.7 | 54.7 | 54.7 | 54.7 |
| DEXTROSE MONOHYDRATE | 9.9 | 9.9 | 9.9 | 9.9 |
| GLYCERIN | 1.3 | 1.3 | 1.3 | — |
| 39 DE CORN SYRUP, 85% SOLIDS | 13.3 | — | 6.7 | 13.3 |
| PEPPERMINT FLAVOR | 0.9 | 0.9 | 0.9 | 0.9 |
| HYDROXYLATED LECITHIN | 0.2 | 0.2 | 0.2 | 0.2 |
| RAFTILOSE SYRUP | — | 13.3 | 6.6 | 1.3 |

Figure 5:
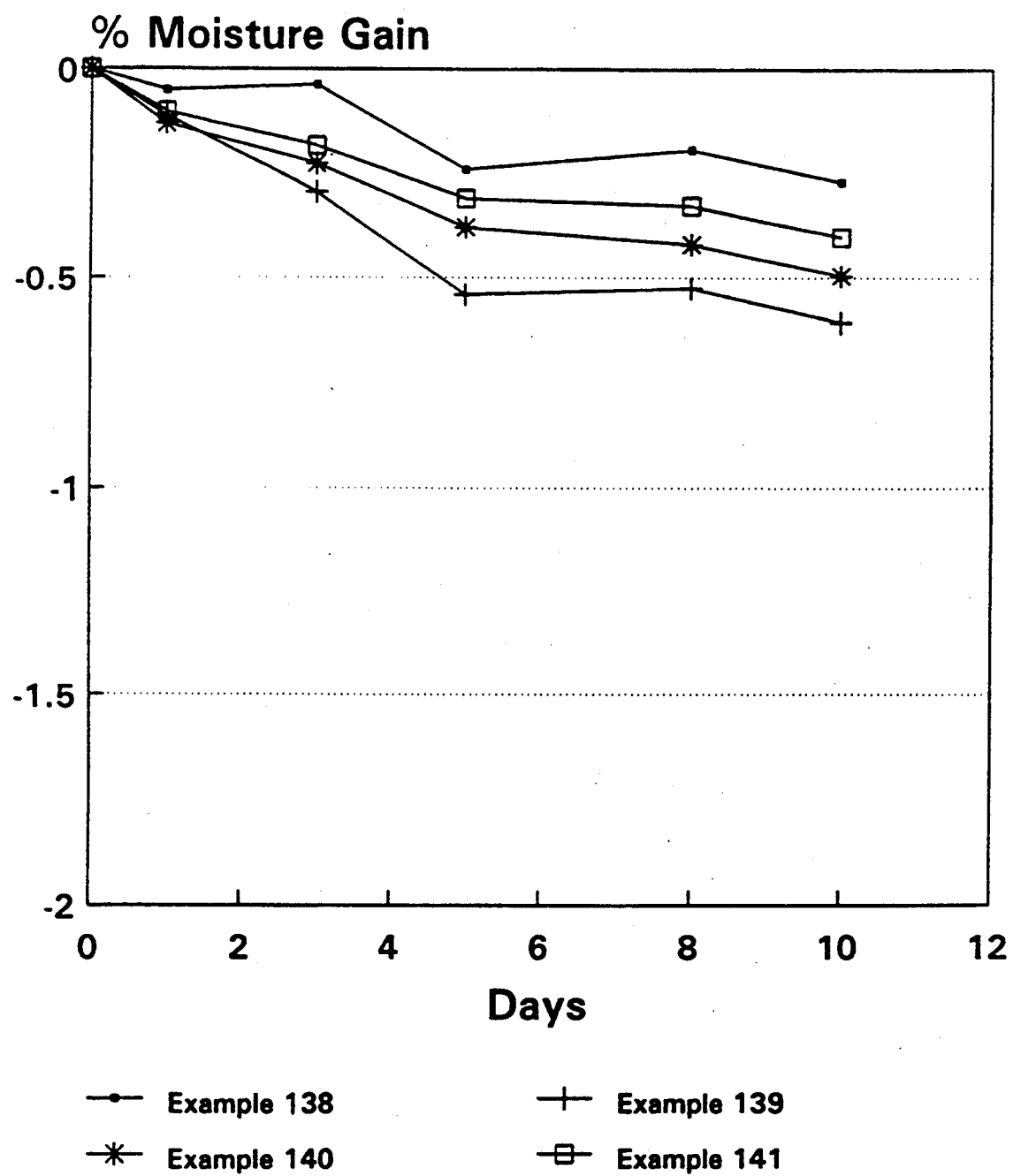
FIG. 5 shows test results of moisture loss at low relative humidity, for gum made with oligofructose syrup.
Figure 6:
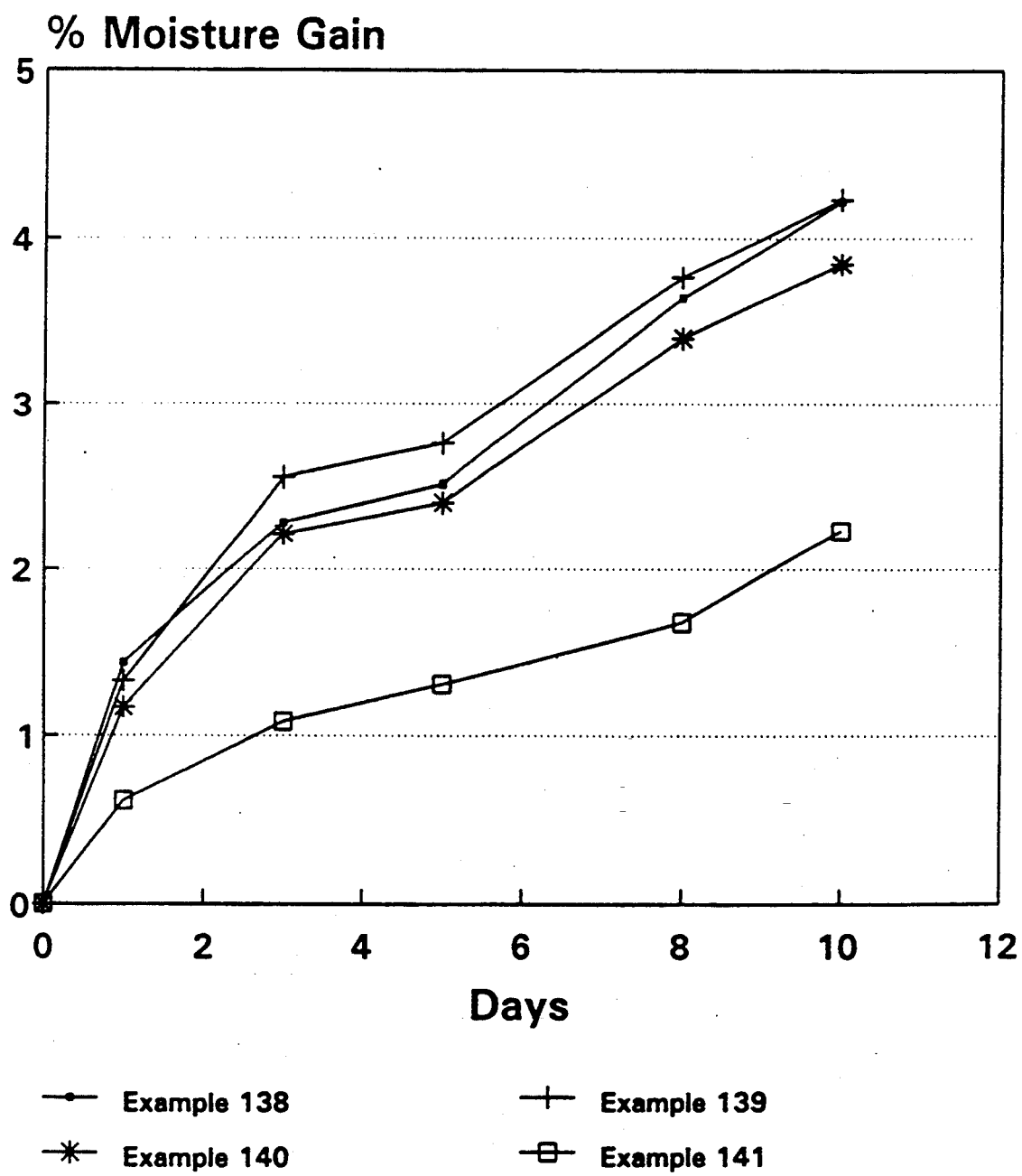
FIG. 6 shows test results of moisture gain at high relative humidity for gum made with oligofructose syrup.

These formulas were made in a conventional lab mixer in a conventional manner and formed into sticks. Samples of each formula were placed in relative humidity chambers at 75° F. and 30% and 80% R.H. and the weight change measured for 0, 1, 3, 5, 8, and 10 days. The test results, shown in FIG. 5 (30% R.H.) and 6 (80% R.H.), appear to be similar to test results expected for similar gum formulations made with a corn syrup of equivalent moisture content. The two sets of formulations would also be expected to have the same humectant properties.

Examples 142–145

The following gum formulations were made:

|  | EX. 142 | EX. 143 | EX. 144 | EX. 145 |
|---|---|---|---|---|
| BASE | 24.4 | 24.4 | 24.4 | 24.4 |
| SORBITOL | 50.1 | 37.6 | 25.1 | 12.6 |
| MANNITOL | 8.0 | 8.0 | 8.0 | 8.0 |
| GLYCERIN | 6.3 | 6.3 | 6.3 | 6.3 |
| COEVPORATED HSH SYRUP AND GLYCERIN* | 9.1 | 9.1 | 9.1 | 9.1 |
| PEPPERMINT FLAVOR | 1.6 | 1.6 | 1.6 | 1.6 |
| LECITHIN | 0.2 | 0.2 | 0.2 | 0.2 |
| COLOR | 0.05 | 0.05 | 0.05 | 0.05 |
| 10% SALT SOLUTION | 0.05 | 0.05 | 0.05 | 0.05 |
| RAPFTILINE | — | 12.5 | 25.0 | 37.5 |
| APM | 0.2 | 0.2 | 0.2 | 0.2 |

*Containing 67.5% HSH solids, 25% glycerin and 7.5% water.

Figure 7:
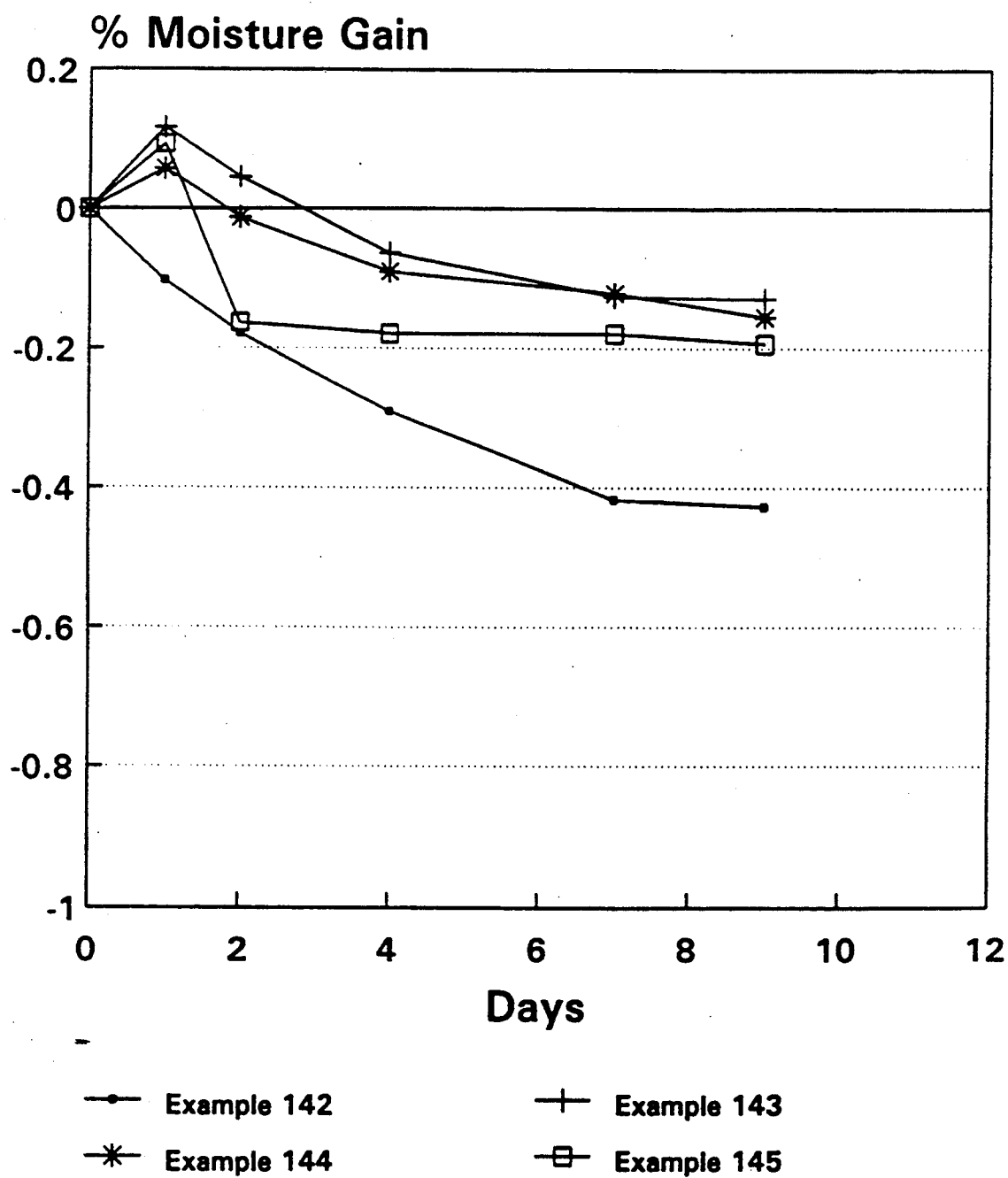
FIG. 7 shows test results of moisture loss at low relative humidity for gum made with oligofructose powder.
Figure 8:
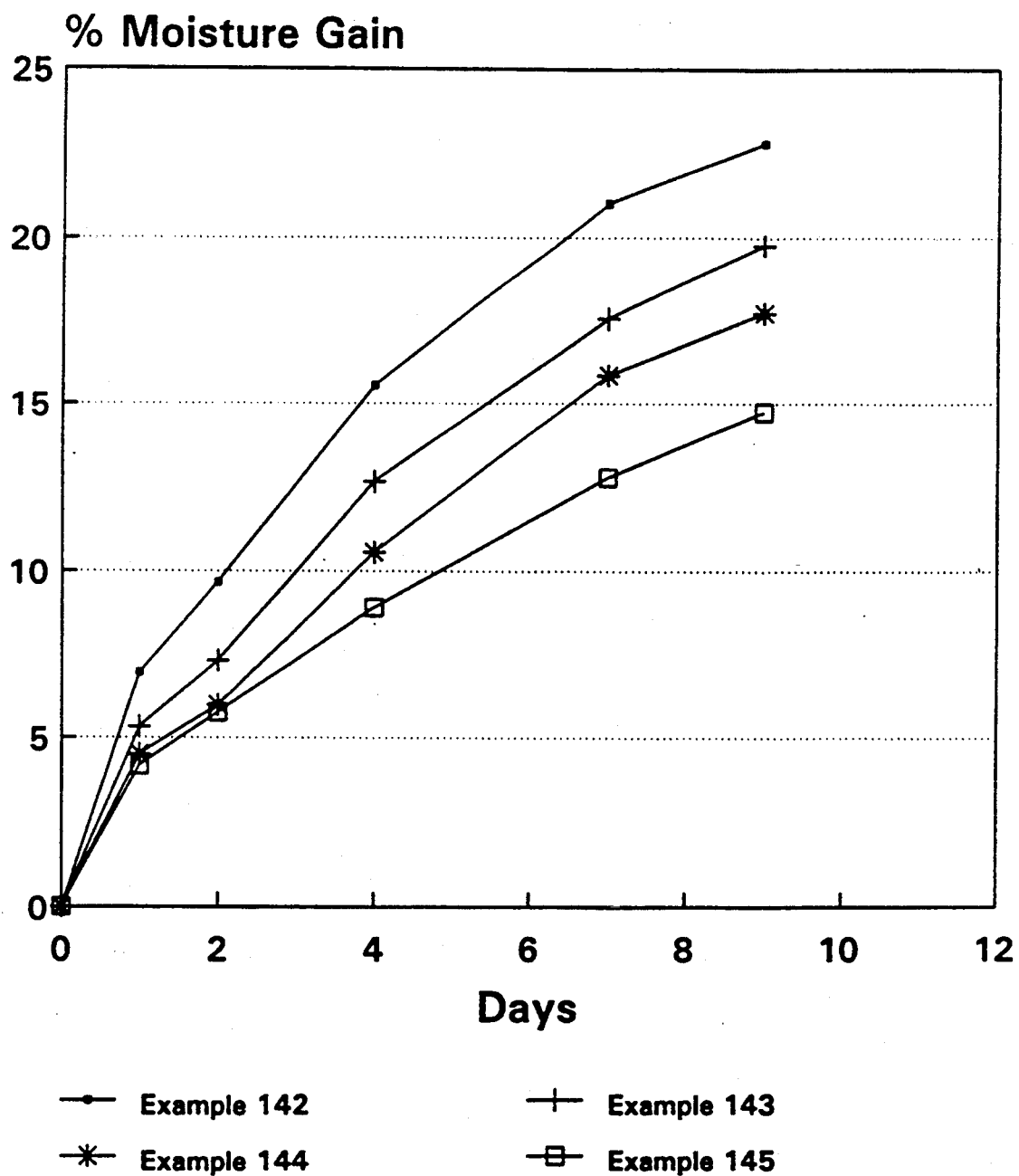
FIG. 8 shows test results of moisture gain at high relative humidity for gum made with oligofructose powder.

These formulas were made in a conventional lab mixer in a conventional manner and formed into sticks. Samples of each formula were placed in relative humidity chambers at 75° F. and 30% and 80% R.H. and the weight change measured for 0, 1, 2, 4, 7 and 9 days. The test results, shown in FIGS. 7 and 8, show that Raftiline reduces the moisture loss and moisture gain of the gum formulation, improving its shelf life.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is therefore indicated by the appended claims rather than by the foregoing description. All changes which come within the meaning and range of equivalency of the claims are to be embraced within their scope.

We claim:

1. A chewing gum composition comprising sweetness imparting amounts of unencapsulated aspartame and an effective amount of oligofructose to stabilize said aspartame against decomposition during storage at 85° F. for eight weeks whereby at least 5% less aspartame decomposes into non-sweetening derivatives than would have decomposed if the oligofructose were not included in the gum composition.

2. The chewing gum composition of claim 1 wherein the gum composition comprises at least 10% oligofructose.

3. The chewing gum composition of claim 1 wherein the gum composition comprises about 0.005% to about 1% unencapsulated aspartame.

4. The chewing gum composition of claim 1 wherein the oligofructose is effective such that after eight weeks of storage at 85° F., over 80% of the unencapsulated aspartame originally formulated in the gum composition remains undecomposed.

5. A chewing gum composition comprising a highintensity sweetener encapsulated with oligofructose.

6. A chewing gum composition comprising a flavor encapsulated with oligofructose.

7. The chewing gum composition of any of claims 1–6 wherein the oligofructose is inulin or an inulin hydrolyzate, and is in the form selected from the group consisting of powdered oligofructose, oligofructose syrup and mixtures thereof.

8. A chewing gum product having a rolling compound thereon, the rolling compound comprising oligofructose.

9. The chewing gum product of claim 8 wherein the oligofructose comprises from about 0.5% to 100% of the rolling compound.

10. The chewing gum product of claim 8 wherein the oligofructose comprises from about 0.005% to about of the chewing gum product.

11. A coated chewing gum product comprising a gum pellet coated with a coating comprising oligofructose.

12. The coated chewing gum product of claim 11 wherein the oligofructose comprises about 0.1% to about 20% of the coating.

13. The coated chewing gum product of claim 11 wherein the coating comprises a hard shell coating.

14. A chewing gum product having a liquid center wherein the liquid center comprises oligofructose.

15. The chewing gum product of any of claims 8–14 wherein the oligofructose is inulin or an inulin hydrolyzate, and is in the form selected from the group consisting of powdered oligofructose, oligofructose syrup and mixtures thereof.

16. A method of making a coated chewing gum product comprising the steps of:
 a) providing a gum pellet;
 b) applying a liquid coating syrup to the surface of the gum pellet, the coating syrup comprising oligofructose, and
 c) solidifying the coating syrup.

17. The method of claim 16 wherein the coating syrup comprises a solution and the step of solidifying the coating comprises drying the solution.

18. The method of claim 16 wherein the coating syrup is applied in successive layers, with each layer of syrup being dried before application of an additional layer.

19. The method of claim 18 wherein a powdered coating is applied after one or more of the syrup layers is applied.

20. The method of claim 19 wherein the powdered coating comprises oligofructose, maltodextrin, gelatin, cellulose derivative, starch, modified starch, vegetable gum, filler and mixtures thereof.

21. A method of making chewing gum comprising the steps of:
   a) co-drying a solution containing oligofructose and another sweetener selected from the group consisting of sugar sweeteners, alditol sweeteners and high-intensity sweeteners, and
   b) mixing the co-dried oligofructose sweetener with gum base and flavoring agents to produce a gum composition.

22. A method of making chewing gum comprising the steps of:
   a) co-evaporating an aqueous solution comprising oligofructose and a plasticizing agent to form a syrup, and
   b) mixing the syrup with gum base, bulking agents and flavoring agents to produce a gum composition.

23. The method of any of claims 16–22 wherein the oligofructose is inulin or an inulin hydrolyzate, and is in the form selected from the group consisting of powdered oligofructose, oligofructose syrup and mixtures thereof.

24. The chewing gum composition of claim 1 wherein the oligofructose is in the form of an aqueous syrup.

25. The method of claim 16 wherein the product is non-cariogenic.

26. The method of claim 16 wherein the product is free of polyols.

27. The method of claim 22 wherein the plasticizing agent is selected from the group consisting of glycerin, propylene glycol and mixtures thereof.

28. A chewing gum composition comprising:
   a) about 5% to about 95% gum base;
   b) about 0.1% to about 10% of a flavoring agent,
   c) about 5% to about 90% bulking agent, the bulking agent comprising at least in part oligofructose, and
   d) sweetening amounts of aspartame.

* * * * *

UNITED STATES PATENT AND TRADEMARK OFFICE
CERTIFICATE OF CORRECTION

PATENT NO. : 5,431,929
DATED : July 11, 1995
INVENTOR(S) : Yatka et al.

It is certified that error appears in the above-indentified patent and that said Letters Patent is hereby corrected as shown below:

In column 3, line 6, replace "decompose$_s$" with --decomposes--.

In column 6, line 41, replace "physicallyisolates" with --physically isolates--.

In column 12, line 3, replace "TabSes" with --Tables--.

In column 12, under "TABLE 3", footnote a, replace "in" with --is--.

In column 12, under "TABLE 4", footnote a, replace "in" with --is--.

In column 13, in line 1 of "TABLE 8", replace "EX. 40" with --EX. 50--.

In column 13, "TABLE 9", delete line 1 "EX.   EX.   EX."; and on line 2, replace "51" with --EX. 51--, "52" with --EX. 52--, "53" with --EX. 53--.

In column 13, under "TABLE 9", delete last line "EX.   EX.   EX", in its entirety.

UNITED STATES PATENT AND TRADEMARK OFFICE
CERTIFICATE OF CORRECTION

PATENT NO. : 5,431,929
DATED : July 11, 1995
INVENTOR(S) : Yatka et al.

Page 2 of 3

It is certified that error appears in the above-indentified patent and that said Letters Patent is hereby corrected as shown below:

In column 14, in line 1 of "TABLE 9-continued", replace "57" with --EX. 57--, "58" with --EX. 58--, "59" with --EX. 59--.

In column 15, "TABLE 10", delete line 1 "EX"; and on line 2, replace "75" with --EX. 75--.

In column 15, "TABLE 10", delete line 18 "EX"; and on line 19, replace "81" with --EX. 81--.

In column 19, line 41, under "EX. 131", replace "34.7" with --24.7--.

In column 19, line 42, under "EX. 132", replace "2.00" with --2.0--.

In column 20, line 19, replace "The" with --This--.

UNITED STATES PATENT AND TRADEMARK OFFICE
CERTIFICATE OF CORRECTION

PATENT NO. : 5,431,929
DATED : July 11, 1995
INVENTOR(S) : Yatka et al.

It is certified that error appears in the above-indentified patent and that said Letters Patent is hereby corrected as shown below:

In column 21, the table under "Examples 138-141", delete line 1 "EX." and on line 2, replace "138" with --EX. 138--.

In column 21, in the table under "Examples 142-145", line 15, replace "RAPFTILINE" with --RAFTILINE--.

In the Claims

In claim 5, lines 1-2, replace "highin-tensity" with --high intensity--.

In claim 10, line 2, after the second occurrence of "about" insert --5%--.

Signed and Sealed this

First Day of August, 2000

Q. TODD DICKINSON

Attest:

Attesting Officer

Director of Patents and Trademarks